United States Patent
Bayer et al.

(10) Patent No.: US 8,174,209 B2
(45) Date of Patent: May 8, 2012

(54) DC-DC CONVERTER AND METHOD FOR MINIMIZING BATTERY PEAK PULSE LOADING

(75) Inventors: Erich Johann Bayer, Thonhausen (DE);
Christophe Vaucourt, Munich (DE);
Hans Schmeller, Woerth (DE)

(73) Assignee: Texas Instruments Deutschland GmbH, Freising (DE)

( * ) Notice: Subject to any disclaimer, the term of this patent is extended or adjusted under 35 U.S.C. 154(b) by 457 days.

(21) Appl. No.: 12/360,703

(22) Filed: Jan. 27, 2009

(65) Prior Publication Data

US 2009/0206772 A1 Aug. 20, 2009

Related U.S. Application Data

(60) Provisional application No. 61/141,840, filed on Dec. 31, 2008.

(30) Foreign Application Priority Data

Jan. 30, 2008 (DE) .......................... 10 2008 006 724

(51) Int. Cl.
*G05F 1/00* (2006.01)
*H02J 7/04* (2006.01)
(52) U.S. Cl. ........ 315/294; 315/297; 315/302; 315/311; 320/140; 320/167
(58) Field of Classification Search .................. 315/291, 315/294–297, 302, 307, 311; 320/140, 167, 320/FOR. 148, FOR. 149
See application file for complete search history.

(56) References Cited

U.S. PATENT DOCUMENTS

| 6,377,112 | B1 | | 4/2002 | Rozsypal | |
|---|---|---|---|---|---|
| 7,560,903 | B2 | * | 7/2009 | Thrap | 320/166 |
| 2003/0122525 | A1 | * | 7/2003 | Stellberger | 320/134 |
| 2003/0169022 | A1 | * | 9/2003 | Turner et al. | 320/166 |
| 2008/0018308 | A1 | * | 1/2008 | Daboussi | 320/167 |
| 2008/0111423 | A1 | * | 5/2008 | Baker et al. | 307/64 |
| 2008/0129219 | A1 | * | 6/2008 | Smith et al. | 315/291 |

FOREIGN PATENT DOCUMENTS

| DE | 19921146 | 5/2000 |
|---|---|---|
| DE | 10 2005 012 662 | 9/2006 |
| DE | 10 2005 030 123 | 4/2007 |
| EP | 0 798 840 | 3/1997 |
| EP | 1 499 165 | 1/2005 |
| WO | 2006081613 | 8/2006 |

\* cited by examiner

*Primary Examiner* — Jason M Crawford
(74) *Attorney, Agent, or Firm* — William B. Kempler; Wade J. Brady, III; Frederick J. Telecky, Jr.

(57) ABSTRACT

The invention relates to an electronic device, comprising a DC-DC converter for converting a primary supply voltage into an output voltage at an output node to be coupled to a super capacitor and a control stage for operating the regulated DC-DC converter in a forward direction in a boost mode providing a boost voltage level at the output node and for operating the regulated DC-DC converter in a reverse direction in a buck mode providing a buck voltage level at an auxiliary node arranged between a primary voltage supply providing the primary supply voltage and the output node, wherein the control stage is adapted to control the DC-DC converter when operating in reverse direction to provide a current to the auxiliary node using the super capacitor as a power source.

12 Claims, 1 Drawing Sheet

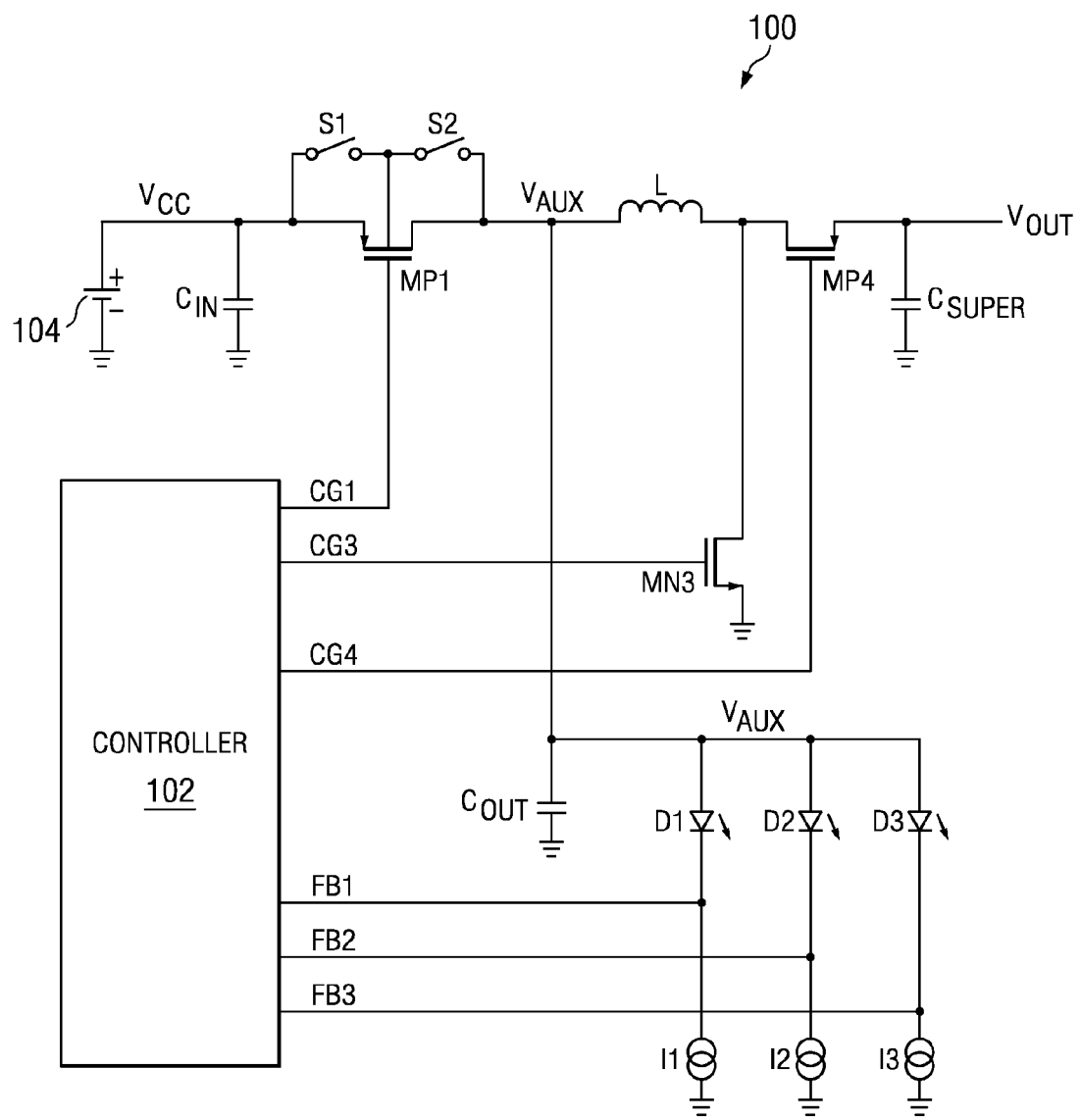

DC-DC CONVERTER AND METHOD FOR MINIMIZING BATTERY PEAK PULSE LOADING

This patent application claims priority from German Patent Application No. 10 2008 006 724.5, filed 30 Jan. 2008 and from U.S. Provisional Patent Application No. 61/141,840, filed 31 Dec. 2008, the entireties of which are incorporated herein by reference.

FIELD OF THE INVENTION

The invention relates to an electronic device for driving a load, such as a light-emitting semiconductor device, and a corresponding method.

BACKGROUND

Portable devices such as, for example, digital cameras or mobile phones offer integrated flash light capability for illuminating the scenery from which a picture is to be taken. To provide a slim form factor alternative to a XENON camera flash light, light sources such as white LEDs can be used. In order to become a usable flash light alternative, one or multiple LEDs must be driven at power levels several orders of magnitude above the maximum current capability of the system's battery. Beside the flash light functionality and the high currents consumed by the LEDs, there are other components and applications of mobile electronic devices that tend to consume similarly high currents. Therefore, with other loads as well, the battery loading limitations are relevant.

The invention provides an electronic device, which includes a DC-DC power converter for converting a primary supply voltage into an output voltage at an output node. The DC-DC converter is adapted to be coupled to a super capacitor (i.e. a capacitor with a very large capacitance value) at the output node. A control stage is provided for operating the regulated DC-DC converter, in a forward direction in a first mode (e.g. a boost mode), providing a first voltage level (e.g. a boost voltage level) at the output node. The control stage is further adapted to operate the regulated DC-DC converter also in a reverse direction in a second mode (e.g. a buck mode) providing a second voltage level (e.g. a buck voltage level) at an auxiliary node. The auxiliary node is arranged between a primary voltage supply providing the primary supply voltage and the output node. Furthermore, the control stage is adapted to control the DC-DC converter to provide a current to the auxiliary node in the second mode (in reverse direction), using the super capacitor as a power source. During the first mode of operation (i.e. in a forward direction), the power stage DC-DC converter operates as a boost converter, thereby maintaining the main output voltage at a regulated constant voltage rail. The super capacitor is biased with the same potential as the output voltage rail. Then during a second mode of operation (i.e. in reverse or backward direction), the operation of the converter is reversed into buck mode for supplying a current to the auxiliary node from the super capacitor. In the second mode, the voltage level at the auxiliary node can be lower (i.e. for example a lower or buck voltage level) than in the first mode. Preferably, in the second or buck mode (i.e. in reverse direction), the DC-DC converter is controlled by a control stage so that a high instantaneous current is provided to the auxiliary node from the super capacitor. According to the invention, the same components of the DC-DC converter (e.g. switches, inductor etc.) are used in a forward direction as a boost converter and in a reverse direction as buck converter. Input and output nodes are swapped, so that the output node in the forward direction becomes the input node in the reverse direction (second mode). Therefore, the node to which the load is coupled, while the DC-DC converter is operated in the forward direction, becomes the power supplying node when the DC-DC converter is switched into the second mode (i.e., in reverse direction). The auxiliary supply mechanism in reverse direction, where the super capacitor is used as a power source allows power losses, thermal stresses and also the size of the integrated circuit to be minimized. During the second mode (i.e. when the DC-DC converter is operated in reverse direction), all of the instantaneous power (e.g. peak current) is provided by the super capacitor and the battery is not subject to high pulse loading. Therefore, a maximum amount of instantaneous current can be provided without the need for a battery that is capable of delivering the high instantaneous current. The DC-DC converter of the invention therefore provides the advantage that the battery peak loading is minimized.

The high instantaneous current in reverse mode can preferably be used for supplying a light-emitting semiconductor device, which may be coupled to the auxiliary node in series with an active current regulator. If the current is sufficiently high the light-emitting semiconductor device can be driven to produce a flash strobe. Due to the DC-DC converter's dual mode capability (i.e., there is a first mode where the DC-DC converter is driven in forward direction and a second mode where the DC-DC converter is driven in reverse direction), the high instantaneous current can be provided by the super capacitor rather than by the battery. This is particularly useful, since using a light-emitting semiconductor device to generate a flash light requires a level of power that can be several orders of magnitude above the maximum current capability of the battery used to provide the primary power supply voltage in a portable device. However, since a maximum amount of current is provided to the auxiliary node by the super capacitor during the second mode of operation (buck mode), this maximum current can be sufficient to allow, for example, a flash light to be generated by the light-emitting semiconductor device when supplied to it.

SUMMARY

An advantageous and simple way to provide the DC-DC converter with the dual mode capability, according to the invention, consists of providing a first switch, which can be coupled between the primary voltage supply and the auxiliary node, for switching the path between auxiliary node and primary voltage supply on and off. Then, the control stage should be adapted to switch the first switch on during the first mode (when the DC-DC converter operates in forward direction in boost mode) and to switch the first switch off during the second mode (when the DC-DC converter operates in buck mode in reverse direction). The first switch can be implemented, for example, by a MOS transistor. In the first mode of operation (boost mode, forward direction), the first switch can be switched on so that the primary voltage supply is connected to the auxiliary node. This means that, in the boost mode, an output voltage can be provided to the output voltage node by the DC-DC converter and the super capacitor can be biased to the output voltage and be charged. In the second mode of operation (buck mode, reverse direction), the first switch is switched off. This disconnects the primary supply voltage from the auxiliary node. The switches of the DC-DC converter can then be controlled such that the super capacitor is used as power supply. The super capacitor is discharged and provides the maximum current to the auxiliary node, which is then available to supply, for example, a light-emitting semiconductor device during a flash strobe. The control stage can be adapted to switch the DC-DC converter between the boost mode and the buck mode as required.

The first switch can be a PMOS transistor, and the other switches can also preferably be NMOS or PMOS transistors. If the first switch is implemented as PMOS transistor, the electronic device according to the present invention can further include a fourth and a fifth switch for switching alternately the bulk of the first switch to either the voltage level at the drain or the source of the PMOS transistor, i.e. the bulk is either connected to the voltage level at the auxiliary node or to the voltage level of the primary voltage supply. This can be necessary as the DC-DC converter is used in two directions. Typically, if the battery is discharged more and more, the voltage level at the supply voltage node can then be lower than the voltage level at the auxiliary node in the second mode (buck mode) when the DC-DC converter is operated in reverse direction. However, the voltage level at the supply voltage rail may be greater than the voltage level at the auxiliary node as long as the battery is charged. Dependent on the voltage levels at the drain and source of the PMOS transistor, the bulk of the PMOS transistor must be connected to either drain or source to avoid that the parasitic backgate diode of the PMOS transistor is forward biased. Accordingly, the fourth switch and the fifth switch are arranged and controlled such that the bulk is either connected to the drain or to the source of the PMOS transistor.

The control stage may also be adapted to control the auxiliary voltage at the auxiliary node so as to minimize power losses. It is possible to adapt the control stage to vary the voltage level at the auxiliary node by measuring the headroom voltage across the active current regulator in which the light-emitting semiconductor device is located. This may be done in a closed loop manner. If a current regulator or regulators (i.e. current sources or current sinks) are provided in the output path coupled to the auxiliary node, which are used to determine the current through the light-emitting semiconductor device, the voltage at the auxiliary node can then be controlled to minimize the voltage drop across the current regulators, which minimizes the power losses.

The invention also provides a method for driving a load with a DC-DC voltage converter. According to the method, the DC-DC converter is operated in a forward direction in a boost mode for charging a super capacitor. Further, the DC-DC converter is operated in a reverse direction in a buck mode for supplying the load with a current from the super capacitor. Generally, the DC-DC converter can be operated in two different modes (e.g., boost and buck mode), in a forward and in a reverse direction. In this way, the method of the invention allows a load to be supplied with a high current without consuming a large amount of instantaneous power (i.e. peak current) from the battery. This minimizes battery peak pulse loading.

BRIEF DESCRIPTION OF THE DRAWINGS

Further features and advantages of the invention will become apparent from the following description of the example embodiments, and with reference to the accompanying drawing, wherein:

FIG. 1 is a simplified circuit diagram of an electronic device according to the invention.

DETAILED DESCRIPTION OF EXAMPLE EMBODIMENTS

FIG. 1 shows a simplified circuit diagram of an electronic device, according to the invention. The electronic device shown and described below can be any type of electronic device, such as, for example, an integrated circuit, a semiconductor chip, a camera, a portable communication device like a personal digital assistant (PDA), a mobile phone or a digital data processing system.

FIG. 1 shows a dual mode DC-DC converter, according to the invention. The DC-DC converter includes the switches (i.e. MOS transistors) MP1, MN3 and MP4, an inductor L and a control stage CNTL for providing the control signals CG1, CG3, and CG4 for the switches. There is also a super capacitor Csuper, which is coupled to the output node Vout of the DC-DC converter. A primary supply voltage node Vcc is connected to a battery BAT and supplies the battery supply voltage to the source terminal of the PMOS transistor MP1, which serves as a switch. A buffer capacitor Cin, for smoothing the voltage at the primary supply voltage node Vcc, is also connected to the primary supply node Vcc so that one plate of the capacitor Cin is connected to the primary supply node Vcc and the other plate of the capacitor Cin is connected to ground. The drain terminal of the transistor MP1 is connected to an inductor L via an auxiliary voltage node Vaux and the gate terminal of the transistor MP1 is connected to a control stage CNTL, which is adapted to switch the transistor MP1 on and off through control signal CG1. The inductor L is connected to an output voltage node Vout via a switch implemented as a PMOS transistor MP4. The drain terminal of the transistor MP4 is connected to the inductor L and the source terminal of the transistor MP4 is connected to the output node Vout. Between the inductor L and the transistor MP4, the drain terminal of an NMOS switching transistor MN3 is coupled to the inductor L and the drain terminal of the transistor MP4, with the source terminal of the transistor MN3 being connected to ground. The super capacitor Csuper is connected between the output node Vout and ground. Gate terminals of the transistors MP4 and MN3 are connected to the control stage CNTL. The control stage CNTL is adapted to switch the transistors MN3 and MP4 by providing respective control signals CG3 and CG4 to the gate terminals of the transistors MN3 and MP4.

Just as an example, three light-emitting diodes (LEDs) D1, D2 and D3 are connected in parallel so that they are all coupled to the auxiliary node Vaux, as well as to ground via current regulators I1, I2 and I3, respectively. The current regulators I1, I2 and I3 can be current sources or sinks, for example, and define the amount of current that can flow through each LED D1, D2 and D3, respectively. The current regulators I1, I2, and I3 can be controlled and independently set to the amount of current to be supplied through the respective LED D1, D2 and/or D3 so that each LED D1, D2 and D3 can either be switched off completely or have the required amount of current flowing through it defined by its respective current regulator I1, I2, I3. An output buffer capacitor Cout, for smoothing the voltage at the auxiliary node Vaux is also connected between the auxiliary node Vaux and ground, in parallel with the LEDs D1, D2 and D3. Although three parallel connected LEDs are shown here as an example, in fact any number of LEDs may be connected to the auxiliary voltage node Vaux. Furthermore, other devices such as audio circuitry, GSM/GPRS/EDGE circuits, or RF transceiver circuitry could be coupled to the output node Vout. Although only LEDs are shown in FIG. 1, the invention is not limited to driving LEDs to produce flash light. In fact any load, which requires a high instantaneous current can be coupled to the auxiliary node Vaux and profit equally from the technical effects of the invention.

The DC-DC converter shown in FIG. 1 which is implemented, according to the invention can be operated in two different modes, in a first mode (boost mode) and in a second mode (buck mode). Moreover, the DC-DC converter is adapted to be operated in forward direction in the first mode, wherein Vcc is the input node and Vout is the output node, and in reverse direction in the second mode, wherein Vout is the input node and Vaux is the output node. Accordingly, input nodes and output nodes are basically swapped when operation of the DC-DC converter is switched from one mode to the other mode. The basic DC-DC converter functionality is provided by switches MN3 and MP4 and inductor L. The duty cycles of the switching of MN3, MP4 (i.e. the length and frequency of the on and off periods) are controlled in accordance with the two different modes.

In the first mode of operation (i.e. in boost mode and in the forward direction) of the device shown in FIG. 1, the transistor MP1 is switched on by the control stage CNTL by providing the control signal CG1 to the gate of transistor MP1. Transistors MN3 and MP4 are switched with a controlled duty cycle by using a pulse width modulator PWM that can be provided e.g. in the control stage CNTL for applying the respective control signals CG3 and CG4 to the gate terminals of the transistors MN3 and MP4 in accordance with a defined clock signal. The DC-DC converter then operates in a boost mode and provides an output voltage derived from the primary voltage supply Vcc to the output node Vout to regulate the output node Vout to a constant voltage level of, for example, +5V. The super capacitor Csuper is then charged to the same voltage as the output node Vout. During this first mode of operation, the primary voltage supply Vcc can, for example, also be used for supplying current to the LEDs D1, D2 and D3 so that they are continuously illuminated.

In a second mode of operation of the device (i.e. e.g. in a buck mode where the DC-DC converter is used in a reverse or backward direction compared with the first mode), the operation of the DC-DC converter implemented by the inductor L is reversed and the converter is operated in a buck mode as a buck converter. To achieve this, the transistor MP1 is switched off by the control stage and the transistors MN3 and MP4 are switched in a controlled duty cycle by the PWM provided in the control stage CNTL. The super capacitor Csuper then discharges and a buck voltage is provided to the auxiliary voltage node Vaux. The super capacitor Csuper serves as power supply and provides a current, preferably a high instantaneous current, for a limited period of time. The current flows through the LEDs D1, D2 and D3 which are coupled to the auxiliary node Vaux. If the current is sufficiently high, a flash strobe is generated in the LEDs D1, D2 and D3. The current through the LEDs D1, D2 and D3 is provided from the charge placed on the super capacitor Csuper during the first mode of operation (boost mode). The PWM provided in the control stage CNTL controls the switching duty cycle of the transistors MN3 and MP4, by applying control signals CG3 and CG4, respectively, to the gate terminals of the transistors MN3 and MP4 so that the super capacitor Csuper discharges by an amount that provides a maximum current to the auxiliary node Vaux, and thus to the LEDs D1, D2 and D3.

The voltage at the auxiliary node Vaux can be controlled by using the control stage CNTL and a control loop. When a voltage drop at the auxiliary node Vaux, due to the maximum current being provided to the LEDs D1, D2 and D3, is sensed by the control stage CNTL, the control stage adapts the duty cycles of switches MN3 and MP4 so as to adapt the voltage level at the auxiliary node Vaux.

It is generally possible that during the second mode (i.e. the buck mode), the DC-DC converter in backwards direction is regulated to provide not all but only a specific amount of instantaneous current from the super capacitor Csuper to the auxiliary voltage node Vaux. This can be achieved by controlling the duty cycle of transistors MN3 and MP4 using the PWM signal provided in the control stage CNTL. Respective control signals CG3 and CG4 may then be applied to the gate terminals of the transistors MN3 and MP4 so that the super capacitor Csuper is discharged only by the required amount of current. The remainder of the necessary current may then be retrieved from the primary supply voltage rail Vcc, so that the battery also supplies current to the auxiliary voltage node Vaux. The required instantaneous current is then commonly provided from the primary voltage supply BAT and the super capacitor Csuper to the LEDs D1, D2 and D3 for generating the flash strobe.

According to a preferred embodiment of the invention, two switches S1 and S2 are provided for alternately connecting the bulk of transistor MP1 either to Vcc or to Vaux. The switches are controlled as follows. S1 is conductive when the voltage level at Vcc is greater than the voltage level at Vaux. Otherwise S1 is open (not conductive). S2 is conductive when the voltage level at Vcc is lower than the voltage level at Vaux. Otherwise S2 is open (not conductive). This provides that the parasitic backgate diodes, which are inherent to the PMOS transistor, are always biased in the backward direction. The same principle applies to an NMOS transistor that may be used instead of a PMOS transistor.

The feedback connections FB1, FB2 and FB3 can be used in order to minimize power consumption of the circuitry shown in FIG. 1. For example, the control stage CNTL can measure through feedback connections FB1, FB2 and FB3 the voltage drop across current regulators I1, I2, I3. The voltage at Vaux may then be controlled by the control stage CNTL so as to minimize the voltage drop, which minimizes power consumption. The control mechanism used for minimizing Vaux can be based on a closed loop principle.

What is claimed is:

1. An electronic device, comprising a regulated DC-DC converter for converting a primary supply voltage into an output voltage at an output node to be coupled to a super capacitor and a control stage for operating the regulated DC-DC converter in a forward direction in a boost mode providing a boost voltage level at the output node and for operating the regulated DC-DC converter in a reverse direction, in which voltage at the output node is an input voltage, in a buck mode providing a buck voltage level at an auxiliary node which is between a primary voltage supply providing the primary supply voltage and the output node, wherein the control stage is adapted to control the regulated DC-DC converter when operating in reverse direction to provide a current to the auxiliary node using the super capacitor as power source.

2. The electronic device according to claim 1, wherein the DC-DC converter operating in reverse direction is adapted to provide an amount of current to the auxiliary node sufficient for supplying a light-emitting semiconductor device coupled to the auxiliary node to produce a flash light.

3. The electronic device according to claim 2, further comprising a current regulator coupled to the auxiliary node for regulating current through the light-emitting semiconductor device.

4. The electronic device according to claim 3, wherein the control stage is further adapted to control the auxiliary voltage at the auxiliary node so as to minimize power losses, in particular so as to minimize voltage drop across the current regulator.

5. The electronic device according to claim 1, further comprising a first switch coupled between the primary voltage supply and the auxiliary node for switching the path between auxiliary node and the primary voltage supply on for operating in forward direction and switching the path off for operating in reverse direction.

6. The electronic device according to claim 5, wherein the first switch is a PMOS transistor, and the electronic device further comprises a fourth and a fifth switch for switching alternately the bulk of the first switch to either the voltage level at the auxiliary node or to the voltage level of the primary voltage supply.

7. A method of driving a load with a regulated DC-DC converter, the method comprising:
    operating the regulated DC-DC converter in a forward direction in a boost mode for charging a super capacitor coupled to an output node, and wherein a control stage operates the regulated DC-DC converter in a reverse direction in a buck mode in which voltage at the output node is an input voltage for supplying the load connected at a point between an input voltage and the super capacitor with the super capacitor as a power source.

8. The method of claim 7 comprising providing an amount of current to the point sufficient for supplying a light-emitting semiconductor device coupled to the point to produce a flash light.

9. The method of claim 7 comprising coupling a first switch between the input voltage and the point for switching the path between point and the input voltage on for operating in forward direction and switching the path off for operating in reverse direction.

10. The method of claim 7 wherein the first switch is a PMOS transistor, and further comprising providing a fourth and a fifth switch for switching alternately the bulk of the first switch to either the voltage level at the point or to the voltage level of the input voltage.

11. The method of claim 7 comprising providing a current regulator coupled to the point for regulating current through a light-emitting semiconductor device.

12. The method of claim 11 wherein the control stage is further adapted to control an auxiliary voltage at the point so as to minimize power losses, in particular so as to minimize voltage drop across the current regulator.

* * * * *